US008355560B2

United States Patent
Mitsui

(10) Patent No.: US 8,355,560 B2
(45) Date of Patent: Jan. 15, 2013

(54) PATTERN EVALUATION SYSTEM, PATTERN EVALUATION METHOD AND SEMICONDUCTOR DEVICE MANUFACTURING METHOD

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 362 days.

(21) Appl. No.: 12/847,716

(22) Filed: Jul. 30, 2010

(65) Prior Publication Data

US 2011/0164807 A1  Jul. 7, 2011

(30) Foreign Application Priority Data

Jan. 7, 2010  (JP) .................................... 2010-2173

(51) Int. Cl.
  *G06K 9/00*  (2006.01)
  *C09K 19/00*  (2006.01)

(52) U.S. Cl. .......................... 382/145; 428/913; 428/914

(58) Field of Classification Search .................. 428/913, 428/914
See application file for complete search history.

(56) References Cited

U.S. PATENT DOCUMENTS

| 6,199,093 B1 * | 3/2001 | Yokoya .......................... 718/102 |
| 7,526,408 B2 | 4/2009 | Mitsui |
| 8,074,093 B1 * | 12/2011 | Johnson ......................... 713/322 |
| 2002/0154824 A1 * | 10/2002 | Christensson et al. ........ 382/239 |
| 2004/0131135 A1 * | 7/2004 | Kojima et al. ................ 375/368 |
| 2009/0324085 A1 * | 12/2009 | Leung et al. .................. 382/190 |

FOREIGN PATENT DOCUMENTS

JP  2005-317848  11/2005

* cited by examiner

*Primary Examiner* — M. Thein
*Assistant Examiner* — Ariel Yu
(74) *Attorney, Agent, or Firm* — Finnegan, Henderson, Farabow, Garrett & Dunner, L.L.P.

(57) ABSTRACT

In accordance with an embodiment, a pattern evaluation system includes an image acquisition unit, a plurality of image processing units, and a control unit which controls the plurality of image processing units. The image acquisition unit loads a series of images of a pattern to be evaluated. The images are acquired at a first speed. The plurality of image processing units process the series of images at a second speed and then output a result of the evaluation of the pattern to be evaluated. The control unit acquires the first and second speeds, estimates the number of the image processing units which allow the time for acquiring the series of images to be substantially the same as the time for processing the series of images, and allocates the estimated image processing units to the processing of the series of images.

11 Claims, 5 Drawing Sheets

PATTERN EVALUATION SYSTEM, PATTERN EVALUATION METHOD AND SEMICONDUCTOR DEVICE MANUFACTURING METHOD

CROSS REFERENCE TO RELATED APPLICATIONS

This application is based upon and claims the benefit of priority from the prior Japanese Patent Application No. 2010-002173, filed on Jan. 7, 2010, the entire contents of which are incorporated herein by reference.

FIELD

Embodiments described herein relate to generally to a pattern evaluation system, a pattern evaluation method and a semiconductor device manufacturing method.

BACKGROUND

To evaluate a pattern, in particular, to evaluate a micropattern of a semiconductor, the following method has heretofore been used: A pattern to be evaluated is imaged by, for example, a scanning electron microscope (SEM) to obtain an SEM image. This SEM image is subjected to particular image processing and then a variety of dimensions are measured. In this way, a desired evaluation (inspection) result is obtained. In general, the same apparatus is used both in acquiring the image of the pattern to be evaluated and in evaluating this image.

In response to increasingly miniaturized and complicated semiconductors, there has recently been a growing need for a variety of high-level image processing. Accordingly, one method has been proposed wherein a pattern is evaluated by an apparatus different from an image acquiring apparatus. In this connection, there has been proposed a system as one example. In this system, a series of images acquired by, for example, a critical dimension (CD)-SEM is registered in an image Data Base together with acquisition conditions for these images. The images are rapidly processed by a server exclusive for image processing. In such a system, high-level image processing is rapidly performed for a great number of pattern images. To this end, a high-speed CPU is mounted on the server exclusive for image processing, and a distributed computing technique is used. This enables efficient processing. In the distributed computing, a plurality of computers connected to one another by a network perform one or more processes (hereinafter referred to as "jobs"). A distributed computing system generally comprises one computer designated as a master, and a plurality of computers called clusters. For example, if 1000 images are processed by 100 clusters, one cluster has only to process 10 images. This allows a significant reduction in processing time. Thus, if all of the clusters can be allocated to one job, image processing is performed in the shortest time.

However, provided that all the available clusters are allocated to processing when the image acquisition is simultaneous with the image processing, there may rise following problem. Specifically, the time for the image processing is shorter than the time for the image acquisition. After finishing the processing, the clusters have a waiting time (idling time) until a next image comes. As a result, the whole system may have a wasteful CPU resource.

On the other hand, if a small number of clusters are allocated in order to avoid the idling, the speed of the image processing does not catch up with the speed of the image acquisition, leading to a decrease in the throughput of the pattern evaluation.

Thus, according to the conventional art, the image acquisition time and the image processing time cannot be predicted when various kinds of pattern images have to be evaluated by various evaluation methods, for example, particularly when a semiconductor pattern is evaluated. Therefore, the number of allocated clusters cannot be optimized. This leads to disadvantages such as an increased processing time and decreased efficiency of the server.

DETAILED DESCRIPTION

In accordance with an embodiment, a pattern evaluation system includes an image acquisition unit, a plurality of image processing units, and a control unit which controls the plurality of image processing units. The image acquisition unit loads a series of images of a pattern to be evaluated. The images are acquired at a first speed. The plurality of image processing units process the series of images at a second speed and then output a result of the evaluation of the pattern to be evaluated. The control unit allocates at least some of the image processing units to the processing of the series of images and causes these image processing units to perform distributed processing. Assuming that n is the number of images to be processed in one distributed processing, that Toh is an overhead time of the distributed processing, and that Ti and Tp are the first and second speeds, respectively, the control unit obtains the optimum number m of image processing units to be allocated in accordance with the following equation:

$$nTi = Toh + n/m \times Tp.$$

Embodiments will now be explained with reference to the accompanying drawings. SEM image data supplied from a CD-SEM is suitably described below as an example of image data for a pattern to be evaluated. This is, however, illustrative only. It should be understood that the following embodiment are also applicable to, for example, image data acquired from optical equipment such as a digital camera or scanner. However, to evaluate a micropattern of a semiconductor device, it is desirable to use the SEM image for its high resolution. In addition, it is to be noted that like parts are provided with like signs throughout the accompanying drawings and are repeatedly described only when necessary.

(1) Pattern Evaluation System

Figure 1:
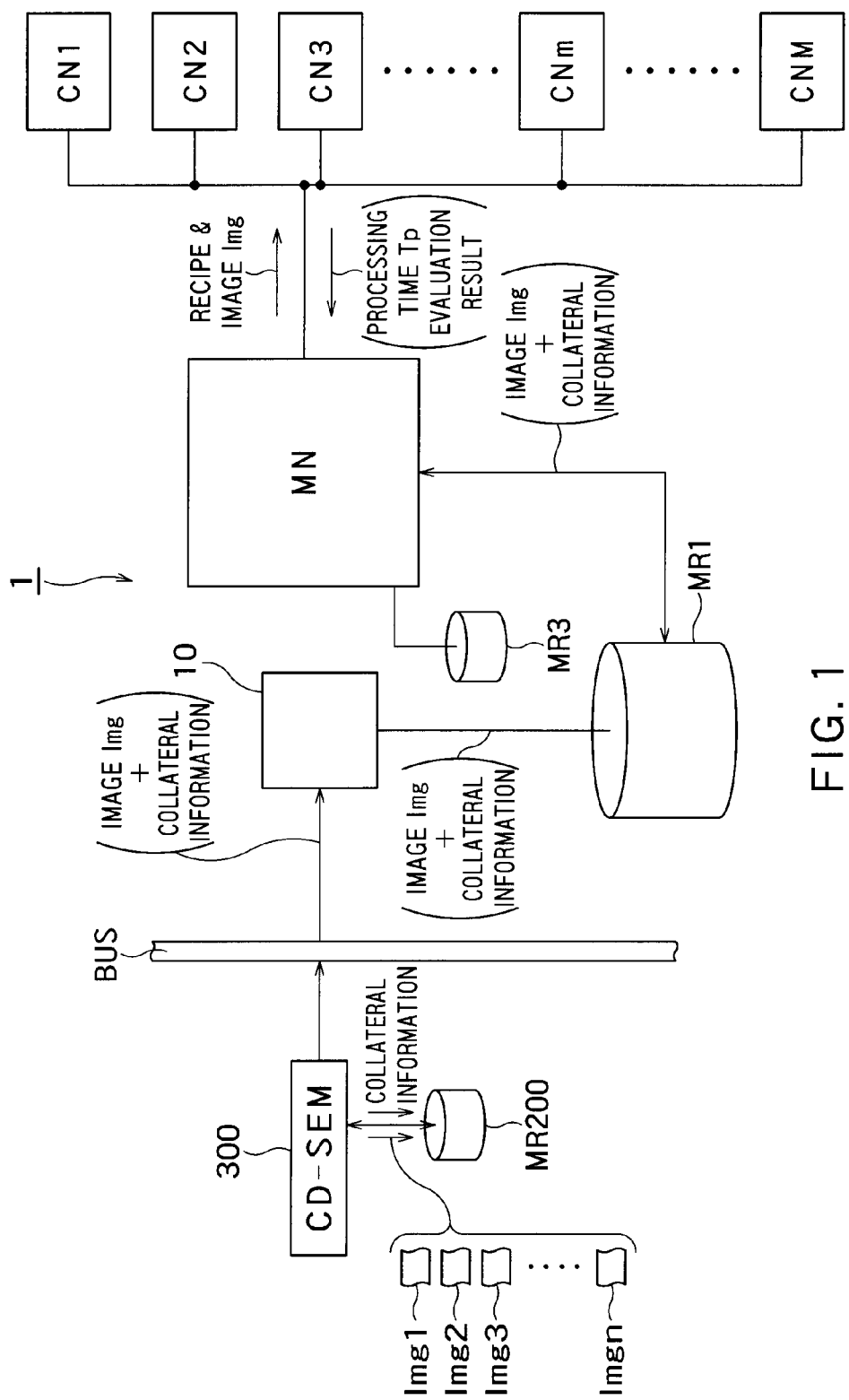
FIG. 1 is a block diagram schematically showing the configuration of a pattern evaluation system according to one embodiment.

FIG. 1 is a block diagram schematically showing the configuration of a pattern evaluation system according to one embodiment. This embodiment is characterized in that a master node MN is provided. The master node MN acquires an image acquisition time Ti that is a per-image time in which an image loading unit 10 loads a series of images Ims. The master node MN also acquires an image processing time Tp that is a time required for a cluster node CN to process the one image. The master node MN then estimates the number of cluster nodes CN so that the time for acquiring the series of images may be substantially the same as the time for processing the series of images, thereby allocating the cluster nodes CN to the processing of the series of images. This will be described in detail later. Here, "substantially the same" means being the same except for measurement errors as well as an overhead time Toh of later-described distributed processing.

A pattern evaluation system 1 shown in FIG. 1 is a distributed computing system. The pattern evaluation system 1 comprises the master node MN, cluster nodes CN1 to CNM (M is a natural number of 2 or more), the image loading unit 10, and memories MR1, MR3.

The image loading unit 10 is connected to the memory MR1, and also connected to an external CD-SEM unit 300 via a bus line BUS. The CD-SEM 300 is connected to a memory MR200. The CD-SEM 300 acquires SEM images Img1 to Imgn (n is a natural number of 2 or more) of patterns of the same shape formed on, for example, a semiconductor substrate. The CD-SEM 300 then stores these images together with their collateral information. Here, the collateral information not only includes SEM image acquisition conditions but also includes information indicating attributes of a pattern to be evaluated, such as a product name, a process name and a production lot number. The time when each of the SEM images is acquired is also written in the collateral information as a time stamp. In accordance with an image registration program created and read in advance, the image loading unit 10 monitors the CD-SEM 300 via the bus line BUS. When the acquisition of the SEM images is started, the image loading unit 10 retrieves, via the bus line BUS and the CD-SEM 300, the SEM images Img1 to Imgn and their collateral information stored in the memory MR200, and stores the images and collateral information in the memory MR1.

The master node MN is connected to the cluster nodes CN1 to CNM (M is a natural number of 2 or more) and the memory MR3. A recipe file in which a specific procedure of a later-described pattern evaluation method is written is stored in the memory MR3. The master node MN reads the recipe file, and supplies the read recipe file to the cluster nodes CN1 to CNM. The master node MN then allocates and supplies the image Img to be processed to the cluster nodes CN1 to CNm (m≦M). Thus, the pattern is evaluated in accordance with the individual recipe.

When the individual image processing recipe and the allocated data for the image Img are supplied from the master node MN, the cluster nodes CN1 to CNM perform image processing, measure necessary parts of the pattern to be evaluated, and from an obtained measurement value, evaluate the pattern to be evaluated. Then, the cluster nodes CN1 to CNM send the results of the evaluation to the master node MN. The cluster nodes CN1 to CNM also supply the master node MN with information on a per-image image processing time Tp. In response to the supplied pattern evaluation results, the master node MN stores the evaluation results, and displays the evaluation results on, for example, a liquid crystal display (not shown).

(2) Pattern Evaluation Method

Figure 2:
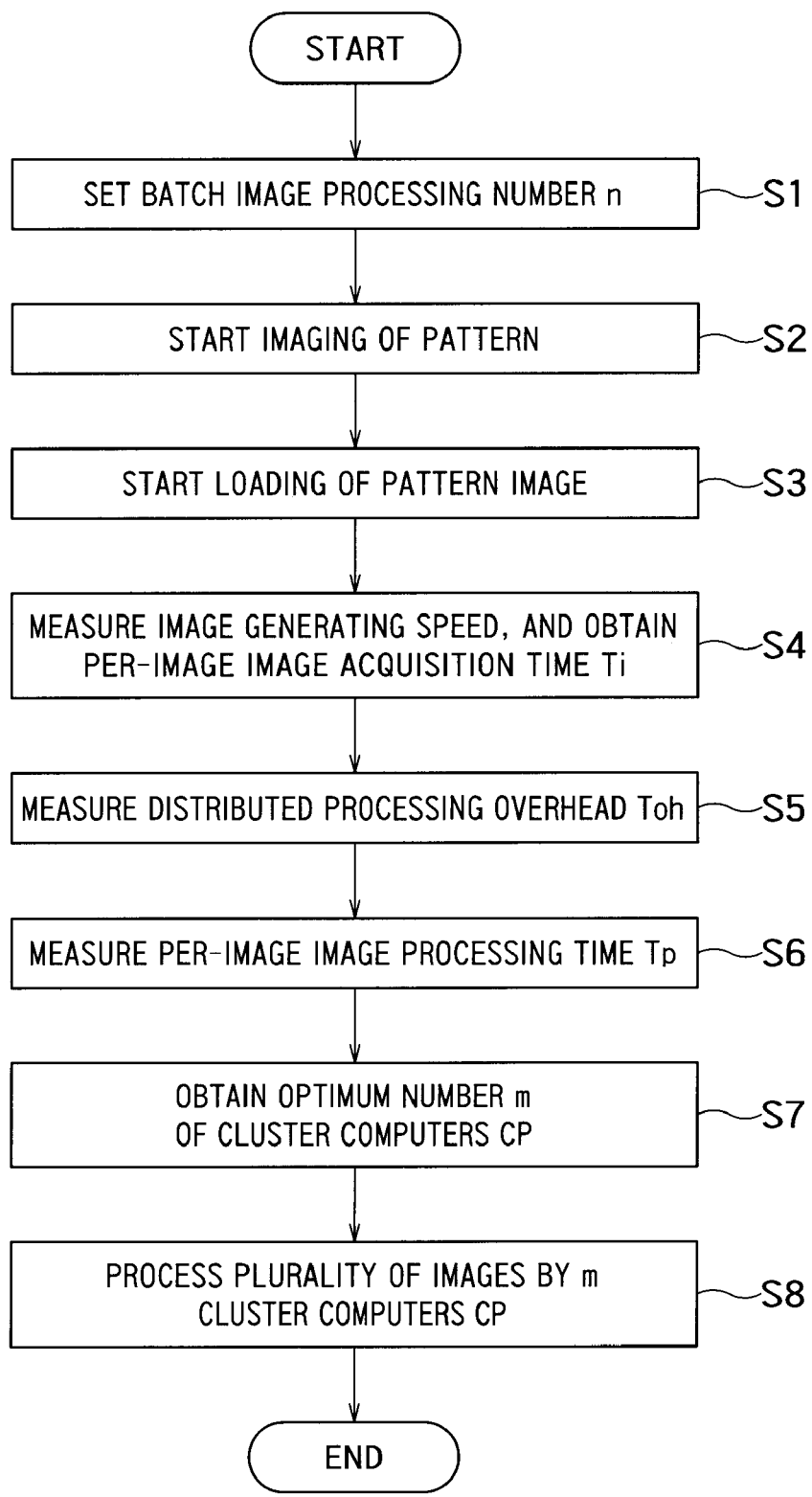
FIG. 2 is a flowchart schematically showing a pattern evaluation method according to one embodiment.

The operation of the pattern evaluation system 1 shown in FIG. 1 is then described as one embodiment of a pattern evaluation method with reference to FIG. 2.

FIG. 2 is a flowchart schematically showing the pattern evaluation method according to this embodiment.

First, an image unit to be subjected to distributed processing for one Job (hereinafter referred to as a "batch image processing number n (n is a natural number of 2 or more)" is set (step S1). An optimum value is selected for the batch image processing number n in accordance with, for example, the load of the whole job as well as the scale and performance of the distributed computing system. In the case described below as one example only, 1000 images are processed and evaluated in a job A, and the batch image processing number is set at 100 (n=100).

Then, imaging of a pattern to be evaluated is started (step S2). In this embodiment, the pattern to be evaluated is imaged by the CD-SEM 300 shown in FIG. 1, and stored in the memory MR200.

When the first SEM image Img1 is acquired up and stored in the memory MR200, the image loading unit 10 starts loading the image (step S3). The image loading unit 10 loads the SEM image Img1 from the memory MR200 via the CD-SEM 300, and stores the SEM image Img1 in the memory MR1 together with collateral information. This image loading processing sequentially continues for the batch image processing number, that is, until the SEM image Img100 is reached.

The master node MN monitors the memory MR1. When a new SEM image Img is stored in the memory MR1, the master node MN causes the cluster node CN to perform image processing in accordance with a procedure previously designated by a recipe file. More specifically, the master node MN refers to an individual recipe table written in the recipe file with the use of the collateral information for the SEM image Img. Then, the master node MN allocates the cluster node CN to image processing, and supplies the cluster node CN with a proper individual recipe and data for the SEM image Img so that the cluster node CN performs the image processing. When the second SEM image Img2 is stored in the memory MR1, the master node MN obtains an image acquisition interval Ti from the image acquisition time included in the collateral information for the SEM images Img1 and Img2 (step S4). This interval Ti is the image acquisition time per image. Moreover, the master node MN measures, as the distributed processing overhead time Toh, a time in which the individual recipe and the data for the SEM image Img are transferred to each cluster node CN (step S5).

The master node MN allocates, for example, the cluster node CN1 to the processing of the first SEM image Img1. When the cluster node CN1 finishes the processing of the SEM image Img1, the cluster node CN1 measures the processing time Tp (step S6), and supplies the main cluster MN with the processing time Tp together with the evaluation result.

The distributed processing overhead time Toh is dependent on the sizes and numbers of images to be processed at a time (in addition to, for example, the communication speed of a network of the system and the performance of a CPU), but can be obtained in advance by actual measurements. In this embodiment, the actual measurement values are stored in advance in the memory MR3 as a table. By referring to the table regarding the distributed processing overhead time Toh, the main cluster MN obtains the optimum number m of the cluster nodes CN to be allocated, in accordance with Equation (1) (step S7).

$$nTi = Toh + n/m \times Tp \quad (1)$$

wherein n: the number of images to be processed at a time
m: the optimum number of cluster nodes
Ti: SEM image acquisition time per image
Toh: distributed processing overhead time Tp: image processing time per image. For the above-mentioned example, the left side of Equation (1) indicates the time in which 100 SEM images are acquired, and the right side indicates the time necessary for the processing of the 100 SEM images. In this embodiment, Ti corresponds to, for example, a first speed, and Tp corresponds to, for example, a second speed.

When the optimum number m of the cluster nodes is thus decided, the master node MN causes the m cluster nodes CN1 to CNm to process the 100 SEM images (step S8).

In accordance with the procedure described above, next 100 images are stored in the memory MR1 at the point where the processing of the former 100 images has been completed. Therefore, the master node MN can immediately cause the cluster nodes CN1 to CNm to process the next 100 SEM images. This enables a series of image processing to be efficiently performed with the minimum CPU resource (number of cluster nodes).

The advantages of the pattern evaluation method according to this embodiment are more specifically described in comparison with a given referential example.

Figure 3:
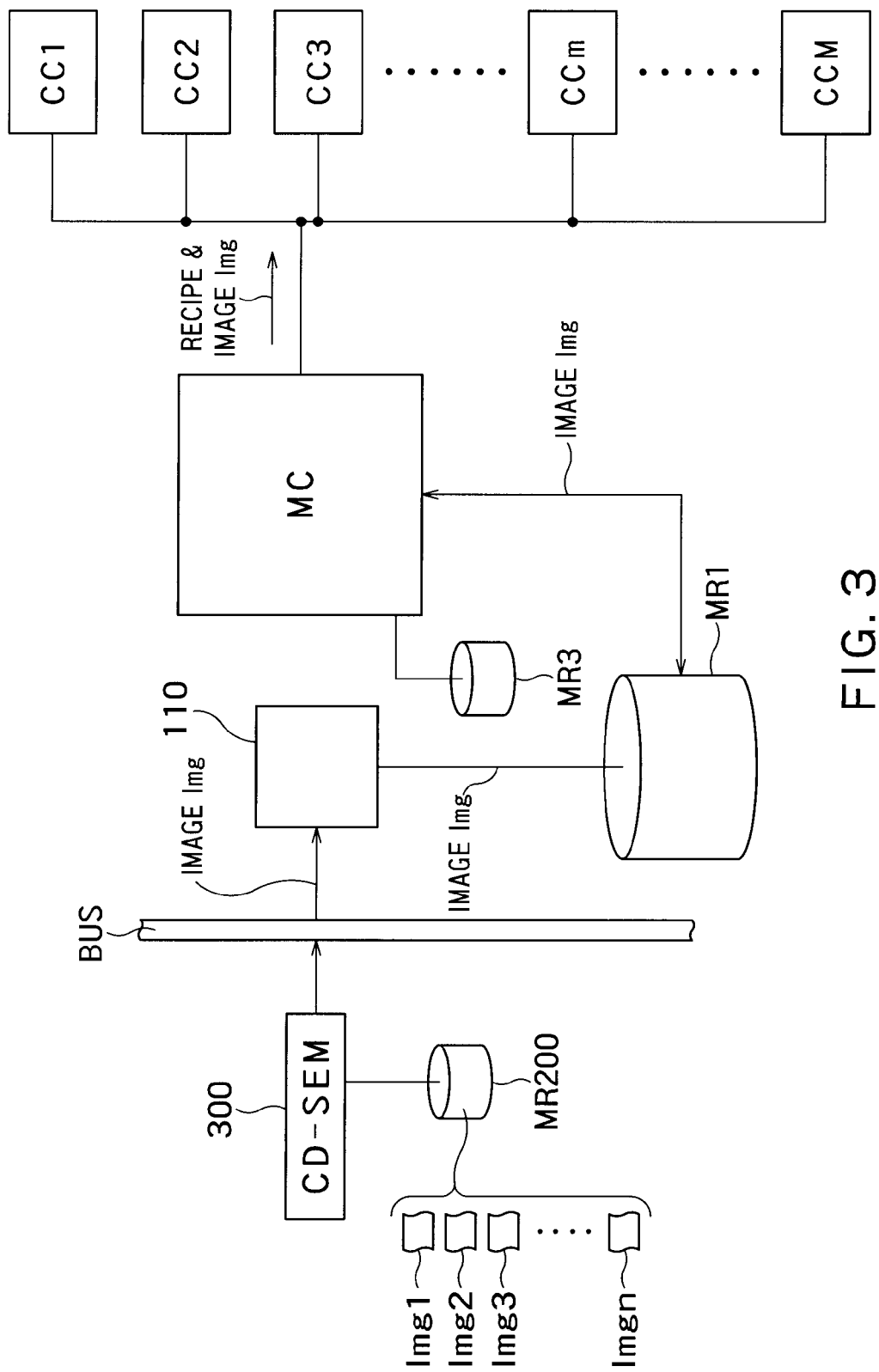
FIG. 3 is a block diagram showing one example of a pattern evaluation system according to a referential example.

FIG. 3 is a block diagram showing one example of the pattern evaluation system according to the referential example. The pattern evaluation system shown in FIG. 3 comprises a master computer MC, cluster computers CC1 to CCM (M is a natural number of 2 or more), and an image loading unit 100. The image loading unit 100 loads SEM images Img1 to Imgn from a memory MR200 via a bus line BUS and a CD-SEM 300, and stores the SEM images in a memory MR1. The master computer MC sequentially supplies data for the SEM image Img stored in the memory MR1 to the cluster computers CC1 to CCM together with individual recipe, and then causes the cluster computers to perform image processing. As in the embodiment described above, an example is cited in which one SEM image Img is transferred per second to the memory MR1 from the CD-SEM 300, each of the cluster computers CC processes one SEM image Img in 5 seconds, and 1000 images are processed in the Job A and 300 images are processed in the Job B. The master computer MC in this example is not equipped with a function of estimating the number of cluster computers CC and allocating these cluster computers so that the time of acquiring the images Img1 to Imgn may be the same as the time of processing these images. Therefore, an operator designates the number of cluster computers CC per Job and allocates these cluster computers. There are thus the following disadvantages:

If the cluster computers CC start image processing after waiting for all 1000 images to be transferred as the Job A, it takes (Toh+5000) seconds. Therefore, in this example as well, image acquisition and image processing start at the same time. If one image is processed every time one image is acquired, the overhead time Toh cannot be 0. This prevents efficient processing. Thus, in order to complete the image processing in the shortest time, processing of, for example, 100 images Img1 to Img100 is started before these 100 images are acquired.

Figure 4:
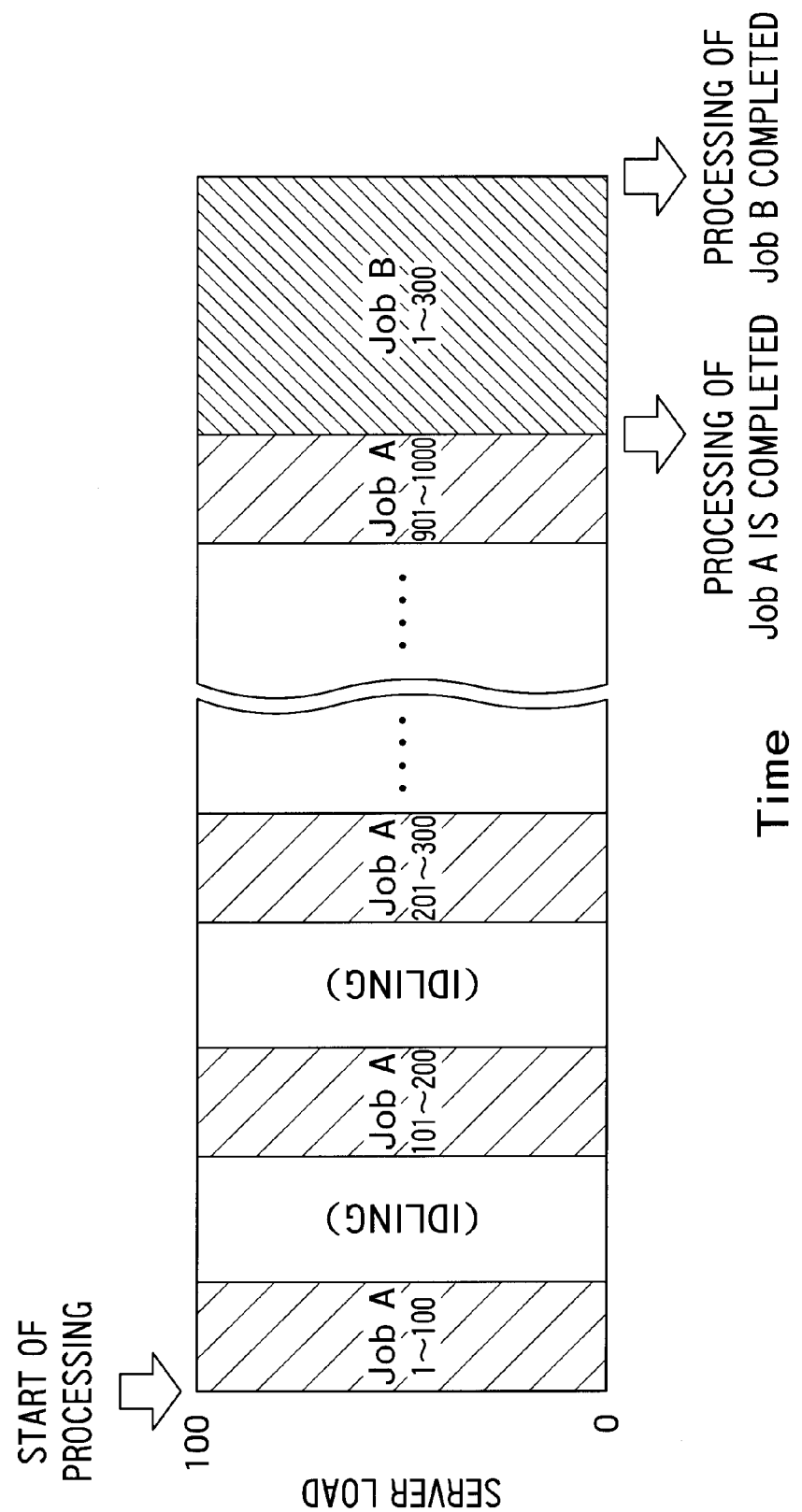
FIG. 4 is a processing diagram according to the pattern evaluation system shown in FIG. 3.

Here, if the operator allocates 100 cluster computers CC1 to CC100, the processing of the images Img1 to Img100 is completed in (Toh+5) seconds. However, next 100 images (Img101 to Img200) are acquired and then transferred to the memory MR1 100 seconds later. Therefore, the cluster computers are free of work and idle for (100−(Toh+5)) seconds. This state is shown in a processing diagram of FIG. 4. Here, the Job A is followed by another Job B, so that this Job B can be allocated to the idle cluster computers CC. However, if the image processing of the Job B is not completed before the next images Img101 to Img200 are transferred to the memory MR1, that is, within (100−(Toh+5)) seconds, then the processing time of the Job A is increased. On the other hand, if a small number of cluster computers, for example, five cluster computers CC1 to CC5 (m=5, m≦M) are only allocated in order to avoid the idle state, a processing time of (Toh+100/5×5) is taken for the cluster computers. In this case, the time required for image processing limits the processing time of the Job A.

Figure 5:
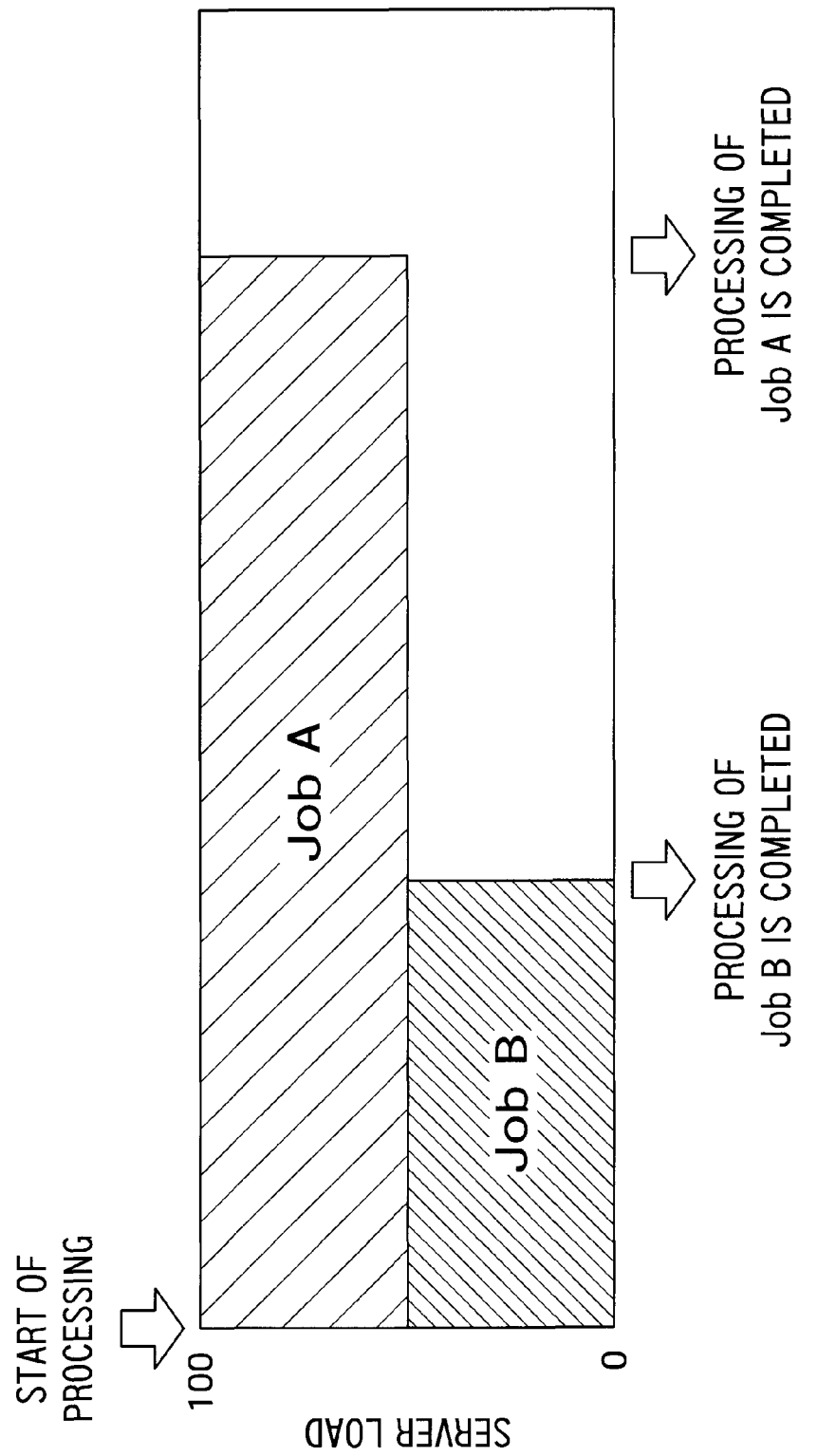
FIG. 5 is a processing diagram according to the pattern evaluation system shown in FIG. 1.

In contrast, according to the embodiment described above, the number of cluster nodes CN is estimated and these cluster nodes are allocated so that the time of acquiring the images Img1 to Img100 may be substantially the same as the time required for the images Img1 to Img100 to be processed by the cluster nodes CN1 to CNm. Thus, it is possible to judge whether the number of remaining cluster nodes CN can be assigned to another Job, e.g., the Job B in this example in accordance with the estimated number of cluster nodes allocated to the Job A. When the remaining cluster nodes CN can be assigned to another Job, it is possible to allocate the cluster nodes CN1 to CNM to the Job A and the Job B so that the Job A and the Job B may be processed at the same time, for example, as shown in a processing diagram of FIG. 5. When the load of the Job B is lighter than the load of the Job A, the processing of the Job B can be completed before the processing of the Job is completed.

Thus, according to this embodiment, a series of images of a pattern to be evaluated can be rapidly processed, and the efficiency of an image processing server can be improved. Consequently, costs for a pattern evaluation can be reduced.

(3) Semiconductor Device Manufacturing Method

When a semiconductor device is manufactured by a process which uses the above-described pattern evaluation method and which includes a highly efficient and low-cost inspection process, the semiconductor device can be manufactured with higher throughput and yield.

More specifically, a substrate is extracted per production lot, and a pattern formed on the extracted semiconductor substrate is inspected by the pattern evaluation method described above. When the substrate is judged as a nondefective product as a result of the inspection, the rest of the manufacturing process is continuously executed for the whole production lot to which the inspected substrate belongs. On the other hand, when the substrate is judged as a defective product as a result of the inspection and can be reworked, rework processing is executed for the production lot to which the substrate judged as the defective product belongs. When the rework processing is finished, the substrate is extracted from the production lot, and the pattern is again inspected. If the extracted substrate is judged as a nondefective product as a result of the reinspection, the rest of the manufacturing process is executed for the production lot finished with the rework processing. In addition, when the rework processing is impossible, the production lot to which the substrate judged as the defective product belongs is disposed of. The cause of the defect is analyzed, and results of the analysis are fed back to a person in charge of designing, a person in charge of an upstream process or the like.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the sprit of the inventions.

For example, in the pattern evaluation system 1 described above, the image loading unit 10 is connected to the external CD-SEM 300 via the bus line BUS. However, as long as secrecy is maintained when, for example, an encryption technology is used together, the image loading unit 10 may be connected not exclusively via the bus line BUS but via a general communication line such as the Internet.

Furthermore, the image loading unit 10 that operates in accordance with a predetermined image registration program has been described above. However, this is not a limitation. For example, the image loading unit 10 may be connected to the master node MN and thus supplied with a control signal. On the basis of this control signal, the image loading unit 10 may perform the operation described above. Moreover, in the embodiment described above, the image loading unit 10 is an independent unit different from the master node MN. However, this is not a limitation. The master node MN may include the image loading unit 10 therein.

The accompanying claims and their equivalents are intended to cover such forms or modifications as would fall within the scope and sprit of the invention.

The invention claimed is:

1. A pattern evaluation system comprising:
    an image acquisition unit configured to load a series of images of a pattern to be evaluated which are acquired at a first speed;
    a plurality of image processing units configured to process the series of images at a second speed and then output an evaluation result of the pattern to be evaluated; and
    a control unit configured to allocate at least some of the image processing units to the processing of the series of images and cause these image processing units to perform distributed processing,
    wherein the control unit obtains an optimum number m of image processing units to be allocated in accordance with following equation:

$$nTi = Toh + n/m \times Tp$$

where n is the number of images to be processed in one distributed processing, Toh is an overhead time of the distributed processing, and Ti and Tp are the first and second speeds, respectively.

2. The pattern evaluation system of claim 1,
    wherein there are a plurality of patterns to be evaluated, and when the number of image processing units allocated to the processing of the pattern to be evaluated being processed is smaller than a total number of image processing units, the control unit judges whether the remaining image processing units are allocatable to processing of the pattern to be evaluated other than the pattern to be evaluated being processed, and when the remaining image processing units are allocatable, causes the remaining image processing units to process the patterns to be evaluated in parallel.

3. The pattern evaluation system of claim 1,
    wherein the control unit is a main node in a distributed computing system and the image processing units are cluster nodes connected to the main node.

4. The pattern evaluation system of claim 1,
    wherein the series of images are acquired by an external imaging unit.

5. The pattern evaluation system of claim 1,
    wherein the images are scanning electron microscope (SEM) images acquired by a scanning electron microscope.

6. A pattern evaluation method using a pattern evaluation system comprising an imaging unit, a plurality of image processing units and a control unit, the pattern evaluation method comprising:
    measuring a first speed at which the imaging unit acquires a series of images of a pattern to be evaluated;
    measuring a second speed at which the image processing units process the images and evaluate the pattern to be evaluated;
    allocating at least some of the image processing units to the processing of the series of images and causing these image processing units to perform distributed processing,
    wherein an optimum number m of image processing units to be allocated is obtained in accordance with following equation:

$$nTi = Toh + n/m \times Tp$$

where n is the number of images to be processed in one distributed processing, Toh is an overhead time of the distributed processing, and Ti and Tp are the first and second speeds, respectively.

7. The method of claim 6,
    wherein there are a plurality of patterns to be evaluated,
    the method further comprises, when the number of image processing units allocated to the processing of the pattern to be evaluated being processed is smaller than a total number of image processing units, judging whether the remaining image processing units are allocatable to processing of the pattern to be evaluated other than the pattern to be evaluated being processed, and when the remaining image processing units are allocatable, causing the remaining image processing units to process the patterns to be evaluated in parallel.

8. The method of claim 6,
    wherein the images are scanning electron microscope (SEM) images acquired by a scanning electron microscope.

9. A semiconductor device manufacturing method comprising:
    extracting a substrate from a production lot including a plurality of substrates in which patterns are formed;
    evaluating the pattern on the extracted substrate; and
    manufacturing semiconductor devices on the substrates of the production lot to which the extracted substrate belongs when the pattern is evaluated as a nondefective product,
    evaluating the pattern comprising:
    measuring a first speed at which a series of images of a pattern to be evaluated is acquired by an imaging unit;
    measuring a second speed at which the images are processed by a plurality of image processing units and the pattern to be evaluated is evaluated; and
    allocating at least some of the image processing units to the processing of the series of images and causing these image processing units to perform distributed processing,
    wherein an optimum number m of image processing units to be allocated is obtained in accordance with following equation:

$$nTi = Toh + n/m \times Tp$$

where n is the number of images to be processed in one distributed processing, Toh is an overhead time of the distributed processing, and Ti and Tp are the first and second speeds, respectively.

10. The semiconductor device manufacturing method of claim 9, wherein there are a plurality of patterns to be evaluated, and the evaluating the pattern further comprises, when the number of image processing units allocated to the processing of the pattern to be evaluated being processed is smaller than a total number of image processing units, judging whether the remaining image processing units are allocatable to processing of the pattern to be evaluated other than the pattern to be evaluated being processed, and when the remaining image processing units are allocatable, causing the remaining image processing units to process the patterns to be evaluated in parallel.

11. The semiconductor device manufacturing method of claim 9, wherein the images are scanning electron microscope (SEM) images acquired by a scanning electron microscope.

* * * * *